United States Patent [19]

Nagel

[11] Patent Number: 5,177,304
[45] Date of Patent: Jan. 5, 1993

[54] METHOD AND SYSTEM FOR FORMING CARBON DIOXIDE FROM CARBON-CONTAINING MATERIALS IN A MOLTEN BATH OF IMMISCIBLE METALS

[75] Inventor: Christopher J. Nagel, Boston, Mass.

[73] Assignee: Molten Metal Technology, Inc., Cambridge, Mass.

[21] Appl. No.: 557,561

[22] Filed: Jul. 24, 1990

[51] Int. Cl.⁵ ............................................. C01B 31/20
[52] U.S. Cl. .................................... 588/201; 423/437; 423/DIG. 12; 588/204; 588/221; 110/346
[58] Field of Search .......... 423/437, 415 R, DIG. 12, 423/DIG. 20; 588/201, 204, 221; 110/346

[56] References Cited

U.S. PATENT DOCUMENTS

| | | | |
|---|---|---|---|
| 2,647,045 | 7/1953 | Rummel | 48/206 |
| 2,923,260 | 2/1960 | Rummel | 110/28 |
| 2,953,445 | 9/1960 | Rummel | 48/216 |
| 3,533,739 | 10/1970 | Pelczorski et al. | 423/415 A |
| 3,647,358 | 3/1972 | Greenberg | 23/2 R |
| 3,668,120 | 6/1972 | Patterson | 210/60 |
| 3,744,438 | 7/1973 | Southwick | 110/8 E |
| 3,812,620 | 5/1974 | Titus et al. | 48/65 |
| 3,969,490 | 7/1976 | de Beuckelaer et al. | 423/481 |
| 4,017,271 | 4/1977 | Barclay et al. | 48/197 |
| 4,187,762 | 2/1980 | Rasor | 60/39.12 |
| 4,244,180 | 1/1981 | Rasor | 60/39.04 |
| 4,246,255 | 1/1981 | Grantham | 423/659 |
| 4,345,990 | 8/1982 | Fahlstrom et al. | 208/11 |
| 4,447,262 | 5/1984 | Gay et al. | 75/65 |
| 4,537,626 | 8/1985 | Pfeiffer et al. | 75/35 |
| 4,574,714 | 3/1986 | Bach et al. | 423/437 |
| 4,848,250 | 7/1989 | Wunderley | 110/235 |

OTHER PUBLICATIONS

Patent Abstracts of Japan: vol. 7, No. 167 Item 58-7374-2(A) (1983).

*Primary Examiner*—Gary P. Straub
*Assistant Examiner*—S. Hendrickson
*Attorney, Agent, or Firm*—Hamilton, Brook, Smith & Reynolds

[57] ABSTRACT

A method and a system for converting carbon-containing feed to atomic carbon and for oxidizing atomic carbon to carbon dioxide is disclosed. Carbon-containing feed, such as municipal garbage, low grade fuel oil and organic or inorganic sludge is introduced to a molten metal bath. The molten metal bath includes a first molten metal phase having a significant solubility of atomic carbon and a second molten metal phase, substantially immiscible in the first molten metal phase and having a solubility of atomic carbon less than that of the first molten metal phase. Carbon in the carbon-containing feed is catalytically converted to atomic carbon. The atomic carbon are oxidized in the first molten metal phase to carbon monoxide which is then directed to the second molten metal phase. Carbon monoxide in the second molten metal phase is oxidized to form carbon dioxide. The carbon dioxide is released to the atmosphere. Other atomic free radicals formed in the molten metal both are substantially converted to oxides and other stable compounds.

17 Claims, 2 Drawing Sheets

METHOD AND SYSTEM FOR FORMING CARBON DIOXIDE FROM CARBON-CONTAINING MATERIALS IN A MOLTEN BATH OF IMMISCIBLE METALS

BACKGROUND OF THE INVENTION

The Environmental Protection Agency (EPA) has estimated that the annual generation of hazardous wastes in the United States (the world) to be in excess of seventy billion gallons. Hazardous wastes include organic materials, such as polychlorinated biphenyls, pesticides, herbicides, municipal garbage, hospital wastes including pathogens, paints, inks and contaminated solvents, blood liquor and explosives. Examples of inorganic wastes which are a serious environmental problem include oxides of iron, zinc, copper, lead, magnesium, aluminum, chromium and cadmium, various powdered metal manufacturing residues and metal-containing sludges.

Further, the EPA classified as toxic, ignitable, corrosive or dangerously reactive many common waste materials, such as paint sludge from appliance factories, dregs of chrome and nickel from metal plating shops, spent raw materials for varnish, carpets and detergents at chemical plants, solvents from dry-cleaned clothes and degreased microchips from computers, mercury from exhausted watch batteries, butane residue from disposable cigarette lighters and lye from cans of oven cleaners.

Landfills are becoming less available as a means of disposing of such wastes. In the absence of suitable landfills, hazardous wastes, hazardous wastes must be transformed to benign and preferably useful substances. There has been tremendous investment in development of alternative methods of treating hazardous wastes. Various types of reactors which have been employed for decomposition of hazardous wastes include for example, rotary kiln, liquid injection, multiple hearth, multiple chamber, fluidized bed, molten salt and high efficiency boilers.

A common reactor for pyrolytic and combustive destruction of organic wastes is the rotary kiln. Pyrolysis in rotary kilns typically is initiated by a high temperature flame. The reactive species generated by the flame are then oxidized by contact with oxygen. However, because the waste material is often highly viscous, it is generally difficult to contact reactive species with oxygen for combustion of the reactive species. The rate of destruction of the waste, therefore, can be impeded. More, heat released by combustion occurs away from the flame tip as reacting materials are fed through the rotary kiln, thereby limiting the heat which can be utilized for the initial pyrolysis step.

Titus, et al., U.S. Pat. No. 3,812,620, disclose a molten pool of glass and miscellaneous metals formed during incineration of "heterogenous waste materials," such as municipal garbage. Various organics in the waste materials are pyrolyzed in the molten pool at temperatures of up to 10,000° F. However, the decomposed materials are not contacted with oxygen introduced into the molten pool.

Rummel, U.S. Pat. Nos. 2,647,045, 2,923,260 and 3,953,445, disclose a molten slag bath formed from reduction of iron ore or from the "non-combustible residues of coal products." Finely divided coal is injected into the bath and separate additions of air is conducted with "an endothermic reactant," i.e., water. The process is preferably conducted in two separate endothermic and exothermic zones.

Rassor, et al., U.S. Pat. Nos. 4,187,672 and 4,244,180 disclose molten iron employed as a solvent for carbon generated by through topside introduction of coal. The coal is then partially oxidized by iron oxide and by introduction of oxygen from above. However, carbonization and oxidation are conducted in distinct carbonization and oxidation chambers.

Molten salt processes are also known, and are typified by the reaction of alkali metal carbonates in a basic, or caustic, molten bath into which oxygen and wastes are injected. However, such baths generally rely principally upon thermal distribution rather than chemical reaction to degrade waste materials. See, for example, U.S. Pat. Nos. 4,447,262, 4,246,255 and 4,017,271.

Large scale destruction of PCBs can be done in large scale high efficiency boilers by their addition to conventional fuel in amounts up to 5%. See "Destruction of High Concentration PCBs in a Utility Boiler," by Siedhoff, Zale and Morris, Proceedings of the 1983 PCB Seminar, Electric Power Research Institute. However, the long-term corrosion and other effects on such high efficiency boilers is largely unknown.

Oxidation of wastes by reaction of organic materials and oxygen in the presence of water at high temperature and pressure is another alternative method of disposal. See, Wilhelmi, A. R. and Knoop, P. V., "Wet Air Oxidation—An Alternative to Incineration," Chemical Engineering Progress, 75: 46–52 (1979). However, inorganic salts, char and metal-containing solids can accumulate at the walls of apparatus employed for such methods, thus necessitating removal of accumulated deposits, causing corrosion and limiting the operating capacity and useful life of such apparatus.

Bach, et al., U.S. Pat. Nos. 4,574,714 and 4,602,574 disclose a unitary process wherein organic and inorganic wastes are injected conjointly with oxygen into a molten metal bath. The molten metal bath is comprised of metals and oxides of metals having free energies of oxidation under the conditions of the molten metal bath which are greater than the free energy of oxidation of carbon to carbon monoxide The waste materials are pyrolytically decomposed and oxidized in the presence of the molten metal bath to form carbon monoxide. The carbon monoxide can be oxidized by contact with oxygen gas introduced into the molten metal bath.

SUMMARY OF THE INVENTION

The present invention relates to a new method and to a new system for extracting and catalytically converting carbon-containing feed to atomic carbon and for oxidizing atomic carbon to form carbon dioxide.

A method for catalytically converting carbon-containing feed to atomic carbon and for oxidizing the atomic carbon to form carbon dioxide in a molten metal bath includes introducing the carbon-containing feed to a molten metal bath. The molten metal bath has a first molten metal phase, comprising a metal having a free energy of oxidation, at the molten metal bath conditions, greater than that of oxidation of atomic carbon to form carbon monoxide, and in which the atomic carbon has a significant solubility. The molten metal bath also has a second molten metal phase, substantially immiscible in the first molten metal phase, said second molten metal phase comprising a metal having a free energy of oxidation, at the molten bath system conditions, greater than that of oxidation of carbon monoxide to form carbon dioxide, in which the solubility of atomic carbon is significantly lower than in the first molten metal phase, whereby the molten metal bath catalytically converts carbon in the carbon-containing feed to atomic carbon, and whereby atomic carbon formed in the second molten metal phase migrate to the first molten metal phase. Oxygen is introduced into the molten metal bath, whereby atomic carbon in the first molten metal phase are oxidized to form carbon monoxide, and whereby the carbon monoxide migrates to the second molten metal phase, wherein the carbon monoxide is oxidized to form carbon dioxide.

A molten metal bath system for catalytically converting a carbon-containing feed to atomic carbon and for oxidizing the atomic carbon to form carbon dioxide, includes a vessel and molten metal bath disposed within the vessel. The molten metal bath has a first molten metal phase, comprising a metal having a free energy of oxidation, at the molten metal bath conditions, greater than that of oxidation of carbon to form carbon monoxide, and in which atomic carbon have a significant solubility. The molten metal bath also has a second molten metal phase, substantially immiscible in the first molten metal phase, comprising a metal having a free energy of oxidation, at the molten metal bath conditions, greater than that of oxidation of carbon monoxide to form carbon dioxide, in which the solubility of atomic carbon is significantly lower than in the first molten metal phase, whereby the molten metal bath catalytically converts carbon in the carbon-containing feed to atomic carbon, and whereby atomic carbon formed in the second molten metal phase migrate to the first molten metal phase. Means for introducing oxygen to the molten metal bath expose the atomic carbon to oxygen, whereby the atomic carbon in the first molten metal phase are substantially oxidized to form carbon monoxide, and whereby the carbon monoxide is directed to the second molten metal phase, wherein the carbon monoxide formed in the first molten metal phase to be substantially oxidized to form carbon dioxide. Means for removing carbon dioxide remove carbon dioxide formed in the molten metal bath from the molten metal bath system.

This invention has many advantages. Free radicals of atomic constituents, including carbon, are formed from carbon-containing feed materials. At least a portion of the free radicals are converted by exothermic reaction to form relatively stable compounds, such as carbon dioxide and water. The heat generated by the exothermic reaction can be sufficient to cause the molten metals of the molten bath to catalytically convert atomic constituents of additional carbon-containing feed to their respective elements. The free radicals can also directly contribute to formation of other free radicals from the carbon-containing feed. Enough heat can also be generated by the exothermic reaction to transfer heat from the molten bath for other uses, such as for generation of electrical power. Immiscible metals in the molten bath allow selection of combinations of metals according to relative solubility and free energies of oxidation, whereby reaction of free radicals can thereby be controlled to form relatively stable compounds. Chemical energy, mass and thermal energies can be transferred within the molten metal bath to form thermodynamically stable compounds at the conditions specified by each phase of the molten metal bath specifying the reaction system. Further, the conversion to stable compounds can be substantially complete, thereby preventing emission of significant amounts of toxic emissions to the atmosphere. Also, high solubility of the compounds formed in the molten bath permits collection of significant amounts of these compounds in the molten bath. Many of the compounds formed can be disposed of by their nonleachable incorporation into a vitreous crystallographic matrix of a slag layer disposed over the metal bath. Gaseous emissions of deleterious compounds can thereby be substantially reduced.

The features and other details of the method of the invention will now be more particularly described with reference to the accompanying drawings and pointed out in the claims. It will be understood that the particular embodiments of the invention are shown by way of illustration and not as limitations of the invention. The principle function of this invention can be employed in various embodiments without departing from the scope of the present invention.

DETAILED DESCRIPTION OF THE INVENTION

The present invention generally relates to a method and system for extracting atomic constituents from a carbon-containing feed and for converting the atomic constituents to thermodynamically stable forms in a molten metal bath. Bach, et al., U.S. Pat. Nos. 4,754,714 and 4,602,574 disclose a molten metal bath, such as is used in a steel-making facility, which destroys polychlorinated biphenyls and other organic wastes, optionally together with inorganic wastes. The teachings of U.S. Pat. No. 4,754,714 and 4,602,574 are incorporated herein by reference.

Figure 1:
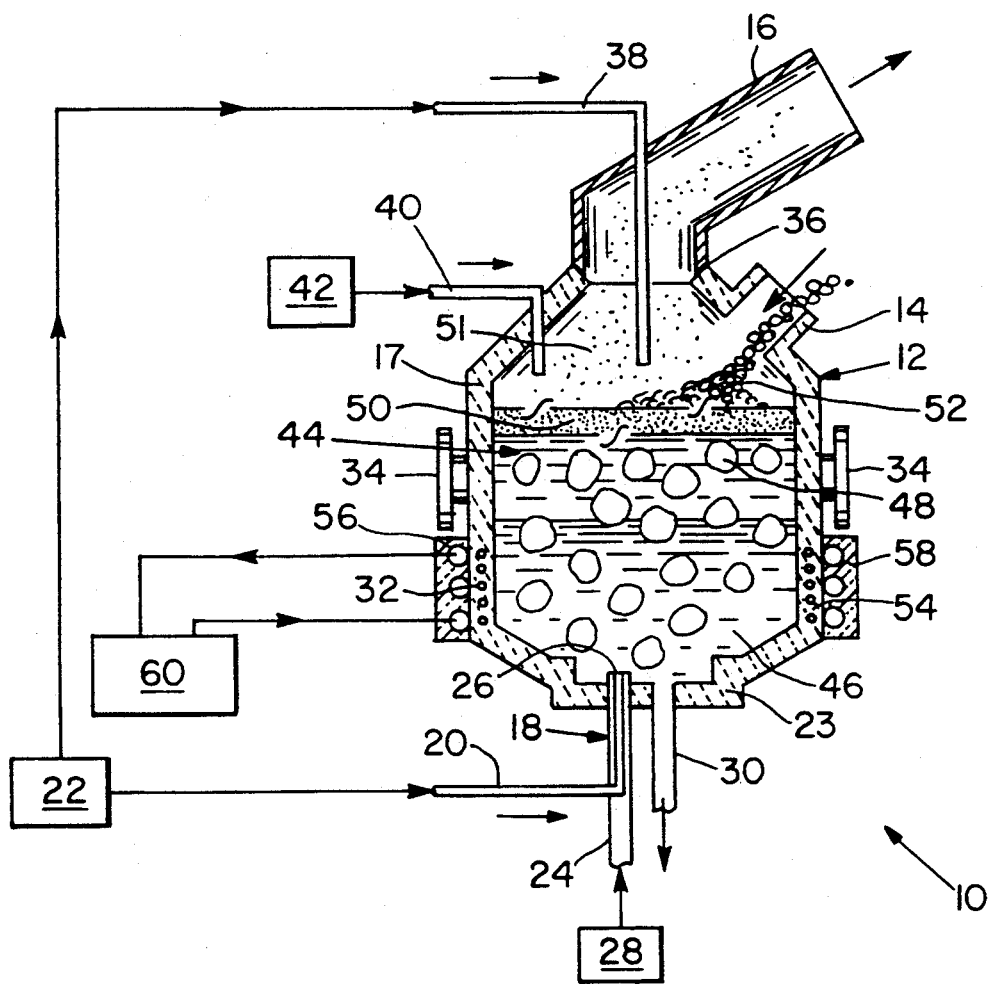
FIG. 1 is a schematic representation of one embodiment of the molten bath system of the present invention.

In one embodiment of the present invention, molten bath system 10 is illustrated in FIG. 1. The figure includes vessel 12. Vessel 12 includes feed inlet 14. Vessel 12 is constructed of a suitable material, as is known in the art. Feed inlet 14 is suitable for directing a suitable carbon-containing feed into vessel 14. Hot gas off-take 16 extends from an open portion 17 of vessel 12 and is suitable for directing hot gas from vessel 12 to a suitable treatment means, not shown, for treating gases formed by the method of the invention.

Tuyere tube 18 includes an oxygen inlet tube 20 providing fluid communication between oxygen source 22 and lower portion 23 of vessel 12. Tuyere tube 18 also includes oxygen inlet tube 20 which is disposed within carbon-containing feed gas source tube 24 at tuyere tube opening 26. Carbon-containing feed gas source tube 24 provides fluid communication between carbon-containing feed gas source 28 and vessel 12. Tuyere tube 18 is dimensioned and configured for conjointly and continuously introducing a suitable carbon-containing feed gas and oxygen into vessel 12. It is to be understood, however, that hydrocarbon gas and oxygen can be introduced to vessel 12 intermittently, rather than continuously. It is also to be understood that more than one tuyere tube 18 can be disposed in vessel 12 and of any suitable to achieve desired blowing patterns as is known in the art.

Bottom drain 30 extends from vessel 12 and is suitable for removal of molten metal from vessel 12. Additional drains may be provided as a means of removing continuously, or discretely, additional phases. Induction coil 32 is disposed at vessel 12 for sufficiently heating vessel 12 to initiate and/or provide heat during the method of the present invention. It is to be understood that vessel 12 can alternately be heated by other means, such as oxyfuel burners positioned above the bath, electric arc, etc. Trunions 34 can be disposed at vessel 12 for manipulation of vessel 12. Seal 36 is disposed between vessel 12 and hot gas off-take 16 and is suitable for allowing partial rotation of vessel 12 about trunions 34 without breaking seal 36 of hot gas off-take 16.

Vessel 12 can be a nonconventional vessel or a conventional vessel. Examples of suitable vessels fitted with appropriate injection means include K-BOP, Q-BOP, argon-oxygen decarbonization furnace (AOD), EAF, etc. which have been fitted with a suitable means for top and bottom injection and top charging as is known in conventional steel making practices.

Molten metal bath 44 is disposed within vessel 12. Molten metal bath 44 includes a first molten metal phase 46. First molten metal phase 46 comprises a metal having a free energy of oxidation, at molten metal bath 44 system conditions, which is greater than that of conversion of free carbon to carbon monoxide Atomic carbon have a significant solubility in first molten metal phase 46. A dynamic carbon balance is maintained at about $\frac{1}{2}\%$ carbon to about 6% carbon, preferable about 2% to about 3%, across the molten iron bath by controlled introduction of carbon-containing feed and oxygen.

Examples of suitable metals in first molten metal phase 46 can include iron, chromium, manganese, etc. It is to be understood that first molten metal 46 can include more than one metal. For example, first molten metal phase 46 can include a solution of metals, in which the atomic carbon have significant solubility. Also, it is to be understood that first molten metal phase 46 can comprise oxides of the metal in first molten metal phase 46.

Molten metal bath 44 also includes a second molten metal phase 48. Second molten metal phase 48 is substantially immiscible in first molten metal phase 46. Second molten metal phase 48 comprises a metal having a free energy of oxidation, at molten metal bath 44 system conditions, which is greater than that of the conversion of carbon monoxide to carbon dioxide. The solubility of free-carbon radical in second molten metal 48 is less than in first molten metal phase 46. In one embodiment, the solubility of atomic carbon in the second molten metal phase is in the range of up to about one percent by weight.

Examples of suitable metals in second molten metal phase 48 include copper, nickel, cobalt, etc. It is to be understood that second molten metal phase 48 can include more than one metal. For example, second molten metal phase 48 can include a solution of metals, in which atomic carbon are less soluble than in first molten metal phase 46. Also, it is to be understood that second molten metal phase 48 can comprise oxides of the metal in second molten metal phase 48.

Molten metal bath 44 can be formed by at least partially filling vessel 12 with suitable metals for first molten metal phase 46 and second molten metal phase 48. The metals are then heated to a suitable temperature by activating induction coil 32 or by other means, not shown. The metals melt during heating and separate to form first molten metal phase 46 and second molten metal phase 48. Reactant addition may be necessary to achieve phase immiscibility. In one embodiment, the viscosity of molten metal bath 44 is no greater than about 10 centipoise. It is to be understood, however, that more than two molten metal phases can be formed. The number of molten metal phases and the metals in the molten metal phases can be selected for transport of heat, mass and chemical energy between molten metal phases to form suitable compounds which are thermodynamically stable at the conditions of molten metal bath 44.

Suitable system conditions of molten metal bath 44 include a temperature and oxygen partial pressure within molten metal bath 44 sufficient to cause the free energy of oxidation of metal in first molten metal phase 46 to be greater than that of conversion of free-carbon radicals to carbon monoxide, and which is sufficient to cause the free energy of conversions of metal in second molten metal phase 48 to be greater than that of conversion of carbon monoxide to carbon dioxide. The temperature of molten metal bath 44 is also sufficient to cause molten metal bath 44 to be fluid and to cause molten metal bath 44 to catalytically convert carbon from a suitable carbon-containing feed to atomic carbon.

In one embodiment, vitreous layer 50 is disposed on molten metal bath 44. Vitreous layer 50 is substantially immiscible in molten metal bath 44. Vitreous layer 50 comprises at least one metal oxide, the metal element of which has a free energy of oxidation, at molten metal bath 44 conditions, less than the free energy of oxidation of atomic carbon to carbon monoxide.

The solubility of carbon and of carbon monoxide in vitreous layer 50 can be less than that of second molten metal phase 48 to thereby retain atomic carbon and carbon monoxide free radical within molten metal bath 44.

In another embodiment, vitreous layer 50 has a lower thermal conductivity than that of molten metal bath 44. Radiant loss of heat from molten metal bath 44 is thereby reduced to below radiant loss of heat from molten bath where no vitreous layer is present.

Examples of suitable metal oxides include titanium oxide (TiO), zirconium oxide ($ZrO_2$), aluminum oxide ($Al_2O_3$), magnesium oxide (MgO), calcium oxide (CaO), etc. Other examples of suitable components of vitreous layer 50 include halogens, sulfur, phosphorus, heavy metals, etc. It is to be understood that vitreous layer 50 can include more than one metal oxide. Vitreous layer 50 is fluid and free radicals and other gases can pass across vitreous layer 50 from molten metal bath 44.

Vitreous layer 50 is formed by directing suitable components, such as metals, metal oxides, halogens, sulfur, phosphorus, heavy metals, fluxes, sludges, etc., from flux source 42 through inlet tube 40 and onto and into molten metal bath 44 or from below the surface of the bath as is known in the art. The components form oxides by exposure of the components to oxygen gas directed into vessel 12 or from other stable compounds at system conditions by reacting with other less stable components, such as alkali metal or alkaline earth metal cations. Examples of such stable reacting products include calcium fluoride ($CaF_2$) and magnesium phosphate ($Mg(PO_4)_2$). A thin vitreous layer 50 facilitates the passage of carbon dioxide, carbon monoxide free radicals and other gaseous species across vitreous layer 50 to gas layer 51.

A gas phase 51 is formed over molten bath 44, or, where there is a vitreous layer 50, over vitreous layer 50. Gas phase 51 can comprise oxygen directed into upper portion 17 of vessel 12 from oxygen source 22 through second oxygen inlet tube 38 when chemical processing within gas phase 51 so warrant. In one embodiment, the Gas phase 51 can also comprise gas formed in molten metal bath 44 and in vitreous layer 50. Free radicals formed in molten bath 44 and in vitreous layer 50 can react with oxygen in gas phase 51 or other materials, preferably organic, passing through gas phase 51. Gases in gas phase 51 are directed out of vessel 12 through hot gas off-take 16 by suitable means. Introduction of oxygen to vessel 12 through second oxygen inlet tube 38 and removal of gas from vessel 12 through hot gas off-take 16 are conducted at rates suitable to maintain an oxygen partial pressure in vessel 12 which is sufficient to catalytically convert carbon in carbon-containing feed to atomic carbon and to convert atomic carbon to carbon dioxide.

In one embodiment, a carbon-containing feed gas and oxygen are directed from carbon-containing feed gas source 28 and oxygen source 22 through tuyere tube 18 into molten metal bath 44 at bottom portion 19 of vessel 12. Carbon-containing feed gas is contacted with molten metal bath 44 and thereby exposed to conditions sufficient to catalytically convert carbon in the carbon-containing gas to atomic carbon.

"Catalytic conversion," as that term is used herein, means that molten metal bath 44 sufficiently weakens the bonds between atoms in carbon-containing feed in the carbon-containing feed to facilitate bond cleavage and to cause the carbons to be converted to atomic carbon at the molten bath system conditions.

Suitable carbon-containing feed gases include, for example, hydrocarbons, etc. In addition to carbon, carbon-containing feed 52 can contain other atomic constituents, such as hydrogen, halides and metals.

The carbon-containing feed gas and the oxygen are directed through tuyere tube 18 simultaneously and conjointly. In one embodiment, the oxygen and carbon-containing feed gas are fed to the molten metal bath 44 at a rate sufficient to form an emulsion of the immiscible first molten metal 46 and second molten metal phase 48. Carbon-free radicals form in first molten metal phase 44 and in second molten metal phase 48.

In an alternate embodiment, first molten metal phase 46 can form a lower layer and second molten metal phase 48 can form an upper layer of molten metal bath 44 adjacent to and above first molten metal phase 46. Vitreous layer 50 is disposed adjacent to and above the second molten metal phase 48 upper layer of molten metal bath 44.

Atomic carbon is less soluble in second molten metal phase 48 than in first molten metal phase 46. Contact between first molten metal phase 46 and second molten metal phase 48 allows transfer of atomic carbon from second molten metal phase 48 to first molten metal phase 46. A substantial portion of atomic carbon formed by conversion of carbon in the carbon-containing feed gas thereby accumulate in first molten metal phase 46.

In addition to atomic carbon, free radicals of other atomic constituents of the carbon-containing feed gas are also formed. These other atomic free radicals can at least partially dissolve in first molten metal phase 46, second molten metal phase 48 or vitreous layer 50. The relative amount of each atomic radical dissolved in the molten metals and vitreous layer 50 is dependent upon the relative solubility of each of those elements in the metals and other components selected for inclusion in molten metal bath 44 and vitreous layer 50. The free radicals can react exothermically with other components in molten metal bath 44 and vitreous layer 50 to thereby generate heat and form reaction products which are stable at the molten metal bath 44 conditions and within molten metal bath 44 or vitreous layer 50.

Alternatively, free radicals other than carbon can be substantially insoluble in molten metal bath 44 and vitreous layer 50, whereby the free radicals migrate within molten metal bath 44 and vitreous layer 50 to gas layer 51 above vitreous layer 50. Oxygen introduced into upper portion 17 of vessel 12 through second oxygen inlet tube 38 contacts the free radicals and reacts with the free radicals to form gaseous oxides. The gaseous oxides are removed from vessel 12 through hot gas off-take 16.

In addition, free radicals, including triplet carbon monoxide, can contribute to formation of other free radicals from the carbon-containing feed.

In another embodiment, non-toxic and semi-toxic carbon-containing feed 52 is introduced to molten bath system 10 through feed inlet 14. Examples of carbon-containing feed 52 suitable for introduction to molten bath system 10 through feed inlet 14 include paper, lumber, tires, coal, etc. Inorganic feeds may also be introduced through carbon-containing feed 52. Suitable examples of inorganic feeds include, but are not limited to, metals and their oxides, sulfides and halides. Feed introduced through feed inlet 14 can be in solid or liquid form. In addition to carbon, carbon-containing feed 52 can comprise other atomic constituents, such as hydrogen, halide, metals, etc.

Carbon-containing feed 52 directed through feed inlet 14 contacts comingles with vitreous layer 50, if a vitreous layer is present, or molten metal bath 44. Contact of carbon-containing feed with molten metal bath 44 or vitreous layer 50 exposes carbon-containing feed to conditions sufficient to convert carbon in the carbon-containing feed to atomic carbon and to convert other atomic constituents to their respective stable species as defined under the conditions of the bath.

Conversion of carbon and other atomic constituents to their respective free radicals can be caused by exposure of the carbon-containing feed to carbon and other free radicals already converted from their atomic constituents in carbon-containing feed, by catalytic conversion during exposure to molten metal bath 44, or by both mechanisms.

A substantial portion of atomic carbon migrate through vitreous layer and contact molten metal bath 44. Other constituents either react with oxygen in the gaseous layer to form gaseous oxides which dissolve into vitreous layer 50 or dissolve into molten metal bath 44. The relative amounts of chemical moieties, including free radicals, in vitreous layer 50 and in first molten metal phase 46 and second molten metal phase 48 is at least partially dependent upon the relative solubility of each chemical constituent in the metals and, metal oxides and other components selected for use in molten bath system 10.

In one embodiment, the solubility of atomic carbon in vitreous layer 50 and second molten metal phase 48 is less than in first molten metal phase 46. Carbon-free radicals, therefore, upon contact with first molten metal phase 46, preferentially dissolve in first molten metal phase 46. Therefore, a substantial portion of atomic carbon formed in molten bath system 10 is directed to first molten metal phase 46.

At least a portion of oxygen directed into bottom portion 19 of vessel 12 through tuyere tube 18 contacts first molten metal phase 46 and atomic carbon dissolved in molten metal phase 46. In one embodiment, the stoichiometric ratio of oxygen introduced to molten bath system 10 to the oxidizable portion of carbon-containing feed is greater than about 1:1. At least a portion of the oxygen which contacts first molten metal phase 46 and atomic carbon dissolved in first molten metal phase 46 reacts with the atomic carbon to form carbon monoxide because the free energy of oxidation of the metal in first molten metal phase 46 is higher than that of oxidation of atomic carbon to form carbon monoxide.

Formation of carbon monoxide in first molten metal phase 46 and contact of first molten metal phase 46 with second molten metal phase 48 causes a substantial portion of the carbon monoxide formed to migrate to second molten metal phase 48. A substantial portion of the carbon monoxide in second molten metal phase 48 contacts at least a portion of the oxygen introduced to molten metal bath 44 through tuyere tube 18 and reacts with the oxygen to form carbon dioxide because the free energy of oxidation of the metal in second molten metal phase 46 is higher than that of oxidation of carbon monoxide to form carbon dioxide.

Formation of carbon dioxide in second molten metal phase 48 causes a substantial portion of the carbon dioxide formed to migrate, such as by diffusion from second molten metal phase 48 through vitreous layer 50 to gas layer 51. Carbon dioxide in gas layer is then directed out of molten bath system 10 through hot gas off-take 16.

Heat released by exothermic reaction of atomic carbon to carbon monoxide and by exothermic reaction of carbon monoxide to carbon dioxide can provide heat for endothermic formation of free radicals of carbon and other atomic constituents of the carbon-containing feed. Exothermic reaction of other free radicals formed from other atomic constituents of the carbon-containing feed can also provide heat for continued generation of free radicals and for other endothermic reaction in molten metal bath 44, in vitreous layer 50 and in gas layer.

Heat released by exothermic reactions, such as by formation of carbon monoxide and carbon dioxide, within molten metal bath 44, vitreous layer 50 and gas layer, can also be transferred out of molten system 10. In one embodiment, heat is conducted through vessel wall 54 to coil 56, covered by a suitable insulation 58, and containing a suitable heat transfer medium, such as water or liquid metal. The heat transfer medium is circulated through coil to thereby transfer heat from molten metal bath 44 to power generating means 60. An example of a suitable power generating means is a steam turbine.

In another embodiment, first molten metal phase 46 comprises iron and second molten metal phase 48 comprises copper. Under quiescent conditions, first molten metal phase 46 forms an upper layer and second molten metal 48 forms a lower layer adjacent to and immediately below the upper layer. The molten copper and molten iron form separate layers because they are substantially immiscible and because they have different densities. Turbulence and agitation within the molten metal bath converts said system to an emulsion. The temperature of first molten metal phase 46 and second molten metal phase 48 is about 2500° F. Vitreous layer 50 comprises calcium oxide (CaO), silicon dioxide ($SiO_2$) aluminum oxide ($Al_2O_3$). Typically, the amount of calcium oxide in vitreous layer 50 is about 40%, the amount of silicon dioxide is about 40% and the amount of aluminum oxide is about 20%.

Vitreous layer 50 is disposed adjacent to and immediately above the upper, second molten metal layer. Chlorobenzene ($C_6H_5Cl$), as a carbon-containing feed gas, and oxygen are directed through tuyere tube 18 continuously and conjointly into the lower layer. The carbon, hydrogen and chlorine in the chlorobenzene are catalytically converted by exposure to the molten iron to carbon, hydrogen and chlorine free radicals. Introduction of oxygen into the lower layer causes atomic carbon to react with the oxygen to form carbon monoxide. The reaction of atomic carbon with oxygen is exothermic, thereby releasing heat for continual endothermic catalytic conversion of chlorobenzene to carbon, hydrogen and chlorine free radicals.

Figure 2:
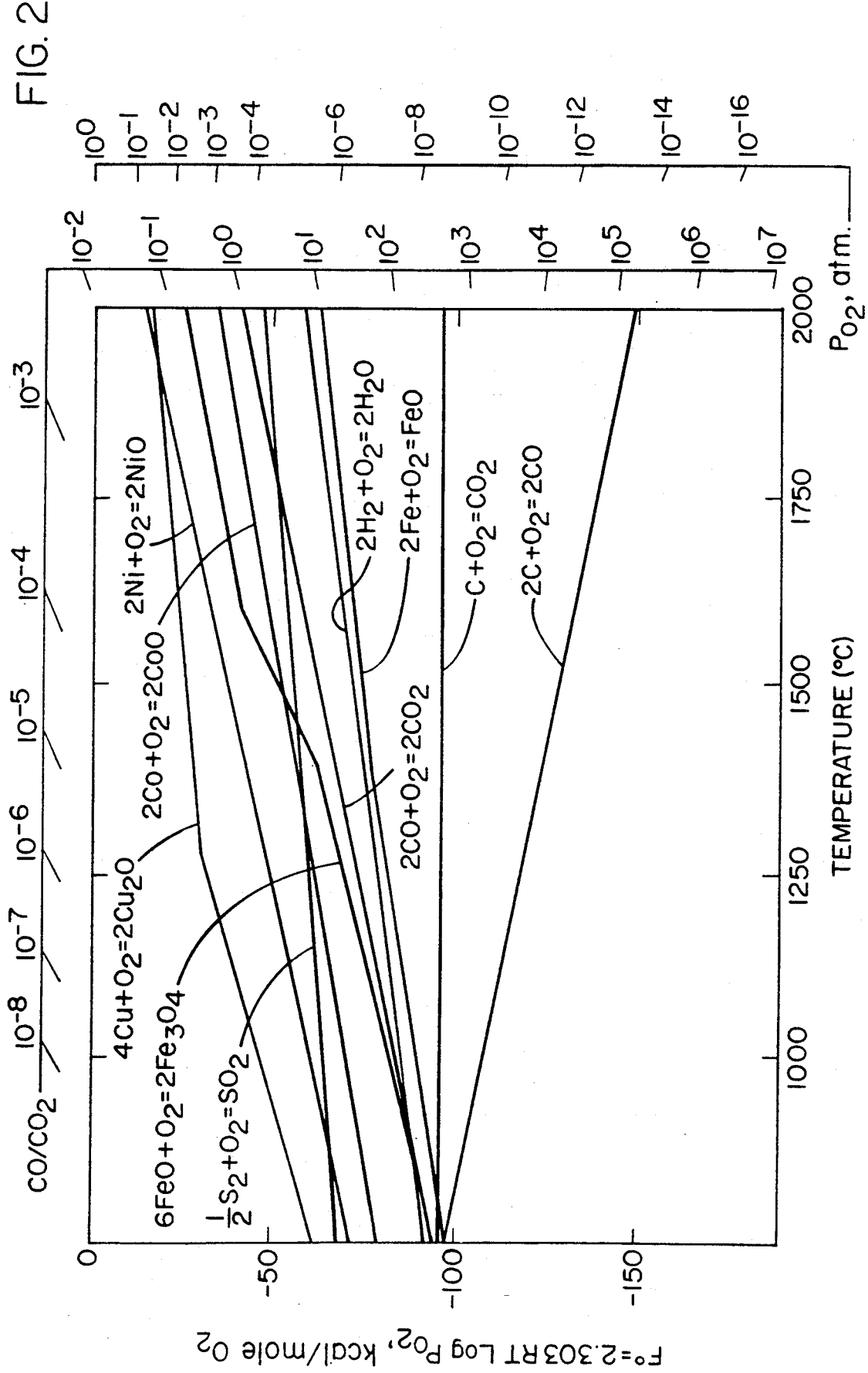
FIG. 2 is a plot of free energies of oxidation of metals suitable for use with the present invention and of oxidation of carbon to carbon monoxide and to carbon dioxide.

As can be seen in FIG. 2, the energy of oxidation of iron is greater than that of conversion of atomic carbon to carbon monoxide above approximately 700° C. Therefore, at least a portion of oxygen introduced to the molten iron will react with the atomic carbon to form carbon monoxide rather than form iron oxide (FeO).

Accumulation of carbon monoxide in the molten iron caused by continuous, conjoint introduction of chlorobenzene and oxygen to the molten iron, and contact between the molten iron, will cause carbon monoxide to migrate from the molten iron to the molten copper. Also, at least a portion of the oxygen introduced to the molten iron will migrate from the molten iron to the molten copper phase.

As can be seen in FIG. 2, the free energy of oxidation of copper at the temperature of molten metal bath 44 is greater than that of oxidation of carbon monoxide to form carbon dioxide and that of oxidation of hydrogen to form water ($H_2O$). Therefore, at least a portion of the oxygen in the molten copper phase will react with the carbon monoxide to form carbon dioxide and with hydrogen to form water rather than react with copper to form copper oxide ($Cu_2O$).

Also, copper has a lower solubility of atomic carbon than does iron. Therefore, atomic carbon will preferentially dissolve in the molten iron phase rather than in the molten copper phase. Lesser solubility of carbon in the molten copper than in the molten iron will allow carbon dioxide to form from carbon monoxide, the free energy oxidation of which is higher than the free energy oxidation of atomic carbon to form carbon monoxide. Equal solubility of atomic carbon in the two layers would prevent complete reaction of the carbon monoxide to form carbon dioxide because the oxygen available would preferentially react with atomic carbon to form carbon monoxide. Therefore, lower solubility of carbon in molten copper than in molten iron lower layer allows substantially complete reaction of the carbon monoxide in the molten copper phase to form carbon dioxide. The carbon dioxide gas then leaves the molten copper and is directed through vitreous layer 50 to gas layer 51 where it is removed from molten bath system 10 through hot gas off-take 16.

Hydrogen free radicals may also be converted to hydroxide free radicals (OH) in the molten copper phase. The hydroxide free radicals can be directed from the molten copper phase to vitreous layer 50 and into gas layer. Oxygen directed through second oxygen inlet tube 38 can thereby react with hydroxide free radicals to form water vapor, which is then removed from molten bath system 10 through hot gas off-take 16.

Chlorine free radicals formed in molten metal bath 44 can migrate, such as by diffusion through molten metal bath 44 to vitreous layer 50, where it can react with calcium oxide to form calcium chloride ($CaCl_2$). Chlorine free radicals can also be directed into gas layer 51 to contribute to conversion of carbon-containing feed directed into molten bath system 10 through feed inlet 14.

In conjunction with the above, it is to be understood that first molten metal phase 46 and second molten metal phase 48 of molten bath system 10 can be selected so that other atomic constituents, for example, hydrogen, have greater solubility in second molten metal phase 48 than in first molten metal phase 46. Those skilled in the art will recognize that the ratio of carbon dioxide and water formed in second molten metal phase 48 will be defined by relative rates of reaction as well as other physiochemical properties describing second molten metal phase 48. Also the metals can be selected such that the free energy of oxidation of the first molten metal phase 46 is less than that of oxidates of the atomic constituents, such as hydrogen, free radicals to form water, for example, but the free energy of oxidation of the metal in second molten metal phase 48 is greater than the free energy of oxidation of the hydrogen free radical.

The basic concept involves the catalytic extraction of dissolveable chemical species from select disposable materials containing hydrogen, carbon, halides, metals, and the like, into attending phases of appropriate chemical composition. The transfer of mass, chemical energy, and latent heat across phase boundaries is accomplished by converting these species to chemical moieties demonstrating lower solubility to the parent phase and preferential solubility to alternative phase(s) comprising the reaction system. The introduction of reactants bearing oxygen, hydrogen, halides, sulfur, and metals is suitable for this purpose.

The partitioning and transfer of mass, heat, and chemical energy to the attending phases will be determined by the relative solubilities of each phase to the chemical moieties and the chemical environment imposed on these species by the associated phase. The associated behavior of a phase and hence its chemical environmental is defined by the characteristic physiochemical properties which specify it. Defining properties typically include composition, temperature and pressure. When the environment specified by the physiochemical properties of the parent phase prevent the liberation of chemical energy to the phase, this (potential) energy may still by released into other attending phases provided their chemical disposition is favorable in that regard. As shown earlier, chemical disposition may be altered through compositional changes, including reactant injection, temperature and pressure changes, and the like.

For example, consider a reaction system comprised of Cr in phase 1, Cu in phase 2, metal oxides such as CaO, $SiO_2$, $Al_2O_3$ in phase 3, and gas residues to the space immediately above phase 3 and in contact with it in phase 4. The injection of chlorobenzene into phase 1 would result in the catalytic extraction of C, H, and Cl by that phase. The transfer of these species and their associated energies to adjacent energies is accomplished by reactant injection. The introduction of $O_2$ into phase 1 converts exothermically C to CO and transfers CO to phase 2. The presence of oxygen in phase 2 exothermically transforms, CO to $CO_2$ and dissolved hydrogen, H to OH. These species may pass through phase 3 into phase 4 where the OH radical still contains chemical energy due to its radical state. If the chemical environment of phase 2 is aggressive towards hydroxyl radical, OH, it may further react to form $H_2O$ in phase 2 with the attending energy release. Chlorine passing through phase 3 may be captured by the CaO present (or injected as a reactant) in phase 3 as $CaCl_2$. Optionally it may be allowed to pass into phase 4 to accelerate decomposition of materials residing in phase 4 through free radical reaction.

The reaction system described above affords the transfer to thermally excited CO from phase 1 to phase 2 and optionally phase 3 and 4 through selective oxygen partial pressure orchestration. The transfer of CO from one phase to another phase, with oxidation occurring in the latter phase, effects an energy transfer from the first phase to the second phase. The passage of CO into phase 4, allows it to act as a radical scavenger to initiate material conversion and decomposition with the evolution of heat when the chemical environment of phase 4 supports radical character. Carbon monoxide may also abstract hydrogen (and other atoms) in a known manner when the enthalpy of the environment excites it to its triplet state. Triplet states having unpaired electrons are known to exhibit open shell or free radical behavior.

The basic concept is again illustrated as follows. By providing an oxygen deficient reaction environment immediately above and in contact with the melt gas interface (phase n), the introduction of water and other hydrogen bearing sources into the bath will produce monotomic hydrogen and oxygen atoms (H and O) and hydroxyl radical in phase n. These reactive species, generated in the liquid phase, will rapidly migrate from phase n−1 and initiate the decomposition step of organic materials passing through phase n. We prefer to maintain a chemical environment of excited atoms and radicals which serve to abstract terminal atoms, such as hydrogen, or induce homolytic bond cleavage within the chosen material. The propagation of new free radicals, resulting from these abstractions and cleavages enhance the propagation of new free radicals that can combine with the dioxygen to support attending transformation reactions. Oxygen atoms also known to insert into covalent chemical bonds in the materials with an evolution of heat corresponding to the bond dissociation energy of a covalent C—O, H—O, N—O, etc.

Equivalents

Those skilled in the art will recognize or be able to ascertain using no more than routine experimentation, many equivalents of the invention described specifically herein. Such equivalents are intended to be encompassed in the scope of the following claims.

What is claimed is:

1. A method for increasing conversion of atomic carbon, formed from a carbon-containing feed, to carbon dioxide in a molten metal bath, comprising the steps of:
   a) introducing the carbon-containing feed to a reactor containing a molten metal bath having:
      1) a first molten metal phase, consisting essentially of metal having a free energy of oxidation, at the molten metal bath conditions, greater than that of oxidation of atomic carbon to form carbon monoxide; and 2) a second molten metal phase for increasing conversion of the atomic carbon to carbon dioxide in the molten metal bath compared to conversion to carbon dioxide in the first molten metal phase, the second molten metal phase being substantially immiscible in the first molten metal phase and in contact with the first molten metal phase, said second molten metal phase consisting essentially of metal having a free energy of oxidation, at the molten metal bath conditions, greater than that of oxidation of carbon monoxide to form carbon dioxide, in which the solubility of atomic carbon is significantly lower than in the first molten metal phase, whereby the molten metal bath in said reactor catalytically converts carbon in the carbon-containing feed to atomic carbon, and whereby atomic carbon formed in the second molten metal phase migrates to the first molten metal phase; and b) introducing oxygen to the molten metal bath, whereby atomic carbon in the first molten metal phase is oxidized to form carbon monoxide and whereby carbon monoxide migrates to the second molten metal phase wherein carbon monoxide is oxidized to form carbon dioxide thereby increasing conversion of the atomic carbon to carbon dioxide in the molten metal bath compared to conversion of atomic carbon to carbon dioxide in the first molten metal phase at the same molten metal bath conditions.

2. A method of claim 1 further including a vitreous layer.

3. A method of claim 2 wherein the solubility of carbon monoxide in the vitreous layer is less than that of the first molten metal.

4. A method of claim 3 wherein the vitreous layer has a lower thermal conductivity than the first molten metal and the second molten metal.

5. A method of claim 4 wherein the carbon-containing feed is exposed in the molten metal bath to conditions sufficient to cause catalytic extraction of substantially all atomic constituents from the carbon-containing feed, whereby the atomic constituents are converted to free radicals.

6. A method of claim 5 wherein the carbon-containing feed is exposed to at least a portion of the free radicals, whereby the atomic constituents of the carbon-containing feed are at least partially extracted from the carbon-containing feed and are thereby converted to free radicals.

7. A method of claim 6 wherein the free radicals formed by extraction of atomic constituents from the carbon-containing feed include hydrogen free radicals.

8. A method of claim 7 wherein the free radicals formed by extraction of atomic constituents from the carbon-containing feed include free hydrogen radicals.

9. A method of claim 8 wherein the carbon monoxide and carbon dioxide formed from carbon generates sufficient heat to allow exposure of the carbon-containing feed to the first molten metal phase and the second molten metal phase to catalytically convert carbon-containing feed to atomic free radicals, including atomic carbon.

10. A method of claim 9, further including introducing oxygen above the vitreous layer in an amount sufficient to substantially oxidize free radicals leaving the molten metal bath and to form a gas phase above the vitreous layer.

11. A method of claim 10 wherein the system is disposed in a vessel and wherein the carbon-containing feed is introduced to the system at the vitreous layer.

12. A method of claim 11 wherein oxygen is introduced through a bottom portion of the vessel.

13. A method of claim 12 wherein the first molten metal forms a first layer and where the second molten metal forms a second layer disposed adjacent to the first layer and above the first layer.

14. A method of claim 13 wherein the oxygen introduced to the system through the bottom portion of the vessel is directed into the first layer.

15. A method of claim 14 wherein the first molten metal phase consists essentially of molten iron.

16. A method of claim 15 wherein the second molten metal phase consists essentially of molten copper.

17. In a method for catalytically converting carbon in a carbon-containing feed to atomic carbon in a molten metal bath, wherein carbon-containing feed and oxygen are introduced to the molten metal bath, and whereby the carbon-containing feed is exposed to conditions sufficient to allow the molten metal bath to catalytically convert carbon in carbon-containing feed to atomic carbon:

the improvement comprising introducing the carbon-containing feed into a reactor containing a molten metal bath having a first molten metal phase consisting essentially of metal having a free energy of oxidation, at the molten metal bath conditions, greater than that of oxidation of atomic carbon to form carbon monoxide, and a second molten metal phase, substantially immiscible in the first molten metal phase and in contact with the first molten metal phase, said second molten metal phase consisting essentially of metal having a free energy of oxidation, at the molten metal bath conditions, greater than that of oxidation of carbon monoxide to form carbon dioxide, in which the solubility of atomic carbon is significantly lower than in the first molten metal phase, whereby atomic carbon formed in the second molten metal phase migrate to the first molten metal phase, and whereby carbon monoxide formed in the first molten metal phase migrates to the second molten metal phase for reacting with oxygen, introduced to the molten metal bath, to form carbon dioxide, thereby increasing conversion of atomic carbon to carbon dioxide in the molten metal bath compared to the conversion of atomic carbon to carbon dioxide in the first molten metal phase at the same molten metal bath conditions.

* * * * *